US010393935B2

(12) United States Patent
Finger

(10) Patent No.: US 10,393,935 B2
(45) Date of Patent: Aug. 27, 2019

(54) HEAD-UP DISPLAY FOR A MOTOR VEHICLE

(75) Inventor: Eckhard Finger, Aschaffenburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/997,159

(22) PCT Filed: Dec. 22, 2011

(86) PCT No.: PCT/EP2011/073732
§ 371 (c)(1),
(2), (4) Date: Jun. 21, 2013

(87) PCT Pub. No.: WO2012/085175
PCT Pub. Date: Jun. 28, 2012

(65) Prior Publication Data

US 2013/0279016 A1 Oct. 24, 2013

(30) Foreign Application Priority Data

Dec. 23, 2010 (DE) ........................ 10 2010 055 839
Mar. 16, 2011 (DE) ........................ 10 2011 014 145

(51) Int. Cl.
*G02B 5/30* (2006.01)
*G02B 27/01* (2006.01)
*G02F 1/1335* (2006.01)

(52) U.S. Cl.
CPC ............. *G02B 5/30* (2013.01); *G02B 5/3066* (2013.01); *G02B 27/01* (2013.01); *G02B 27/0101* (2013.01); *G02F 1/133536* (2013.01)

(58) Field of Classification Search
CPC ....... G02B 5/30; G02B 27/01; G02B 27/0101
USPC ............. 359/630, 599, 443; 349/58; 353/13
See application file for complete search history.

(56) References Cited

U.S. PATENT DOCUMENTS 6,359,737 B1 * 3/2002 Stringfellow ................. 359/631
6,797,396 B1 * 9/2004 Liu ......................... B32B 17/10
359/359
2001/0036013 A1 11/2001 Allen et al.
2002/0167498 A1 11/2002 Eschler et al.
(Continued)

FOREIGN PATENT DOCUMENTS

CN 1732404 2/2006
DE 694 23 651 T2 9/2000
(Continued)

*Primary Examiner* — Evan P Dzierzynski
*Assistant Examiner* — Mitchell T Oestreich
(74) *Attorney, Agent, or Firm* — Cozen O'Connor

(57) ABSTRACT

A head-up display for a motor vehicle, including an image generating device, from which radiation beams of an image, linearly polarized by a polarizer 4 arranged on the image generating device on the light exit side, are guided via an imaging optical unit to a windscreen and are directed from the windscreen in the direction of a driver of the motor vehicle. A reflective linear polarizer is arranged in the beam path of the radiation beam between the image generating device and the windscreen, the polarization direction of which linear polarizer corresponds to the polarization direction of the radiation beam emitted by the image generating device, and which linear polarizer reflects differently polarized light radiating on the beam path from the windscreen to the image generating device.

11 Claims, 2 Drawing Sheets

(56) References Cited

U.S. PATENT DOCUMENTS

| | | | | |
|---|---|---|---|---|
| 2002/0183921 | A1* | 12/2002 | Sugiyama et al. | 701/200 |
| 2004/0008412 | A1 | 1/2004 | Jiang et al. | |
| 2004/0135742 | A1 | 7/2004 | Weber et al. | |
| 2005/0162738 | A1 | 7/2005 | Kanamori et al. | |
| 2007/0146638 | A1 | 6/2007 | Ma et al. | |
| 2009/0079909 | A1 | 3/2009 | Ouderkirk et al. | |
| 2011/0051029 | A1* | 3/2011 | Okumura | 349/57 |

FOREIGN PATENT DOCUMENTS

| | | | |
|---|---|---|---|
| DE | 699 18 299 | T2 | 8/2005 |
| DE | 699 20 768 | T2 | 10/2005 |
| DE | 10 2005 020 233 | A1 | 11/2006 |
| EP | 1 126 292 | A2 | 8/2001 |
| JP | 2000-131682 | | 5/2000 |
| JP | 2002-293162 | | 10/2002 |
| JP | 2008-070782 | | 3/2008 |
| WO | WO 01/46739 | A2 | 6/2001 |

* cited by examiner

HEAD-UP DISPLAY FOR A MOTOR VEHICLE

CROSS REFERENCE TO RELATED APPLICATIONS

This is a U.S. national stage of application No. PCT/EP2011/073732, filed on Dec. 22, 2011. Priority is claimed on German Application No. 10 2010 055 839.7, filed Dec. 23, 2010; and German Application No. 10 2011 014 145.6 filed 16 Mar. 2011 the contents of which are incorporated here by reference.

BACKGROUND OF THE INVENTION

1. Field of the Invention

The invention relates to a head-up display for a motor vehicle, having an image generating device, from which beams of an image are guided, linearly polarized by a polarizer arranged on the light-exit side on the image generating device, via an imaging optical unit to a windscreen, and are directed from the windscreen in the direction of a driver of the motor vehicle.

2. Description of Prior Art

In such a head-up display, a representation of information is projected by a projection system into the windscreen for the driver of the motor vehicle.

The image is generated by the image generating device. Terminating with respect to the observer, an absorbing polarizing film is situated on the image generating device. The light from the image generating device is linearly polarized by the polarizing film. This polarization is perpendicular to the plane of the projection.

Due to the light paths and the reflection of the beam of the projection image at the windscreen, it is possible that the sun shines directly into the image generating device. Due to the focusing of the imaging optical unit, a significant amount of heat is introduced into the image generating device.

To reduce the heating, it is known to arrange a cold mirror, which is transparent or absorbing in the infrared spectral range, in the beam path of the beam between image generating device and windscreen.

Nevertheless, sufficient luminous power can still be incident on the image generating device for the latter to be heated to temperatures which impair the generated image.

SUMMARY OF THE INVENTION

An object of one embodiment of the invention is to provide a head-up display of the type mentioned in the introduction, which significantly reduces solar irradiation of the image generating device.

According to one embodiment of the invention a reflecting linear polarizer is arranged in the beam path between the image generating device and the windscreen, the polarization direction of which corresponds to the polarization direction of the beam emitted by the image generating device and which reflects light that travels along the beam path from the windscreen to the image generating device and has a different polarization.

Light that is irradiated from the sun through the windscreen into the beam path between windscreen and image generating device having a polarization direction that does not correspond to the polarization direction of the reflecting polarizer is reflected by the reflecting linear polarizer and cannot cause heating of the image generating device.

The reflecting polarizer can be arranged at any location in the beam path between the image generating device and the windscreen.

In one advantageous configuration, the reflecting polarizer can be arranged on the light-exit-side polarizer of the image generating device.

No separate installation of the reflecting polarizer is necessary if the reflecting polarizer and the light-exit-side polarizer of the image generating device are formed in a common film.

In another embodiment, a reflecting linear polarizer can be arranged in the beam path of the beam between the image generating device and the windscreen, the polarization direction of which is orientated vertically with respect to the polarization direction of the beam emitted by the image generating device and which transmits that light and which reflects or absorbs the light that travels along the beam path from the windscreen to the image generating device that has a different polarization.

The beam emanating from the image generating device is directed onwards by the reflecting polarizer toward the windscreen and from there in the direction of the driver. One portion of the sunlight traveling in the beam path from the windscreen to the image generating device is reflected by the reflecting polarizer, and only another portion is transmitted, with the result that only the transmitted portion can reach the image generating device and cause the heating of it.

The reflecting polarizer can be a mirror of the imaging optical unit.

In order to protect against external influences, the image generating device and the imaging optical unit can be arranged inside a housing, which has an opening closed by a light-transmissive cover panel and through which the beam from the image generating device reaches the windscreen.

The reflecting polarizer can be arranged on or in the cover panel.

For the purpose of simplifying installation, no separate installation of cover panel and reflecting polarizer is necessary.

This configuration also results in high transmission values and thus in a head-up display having a great efficiency.

In principle, when arranging the reflecting polarizer on the image generating device, a further s-polarizing polarizer on the light-exit side on the image generating device is not necessary.

Due to the less optimum polarization effect of reflecting polarizers, which would result in lower contrast of the representation if they were arranged alone on the light-exit side on the image generating device, both a pure linearly absorbing polarizer and a reflecting polarizer are preferably arranged on the light-exit side on the image generating device.

If the image generating device is a liquid-crystal display, through which a light source can shine and which, on the light-entry side, carries a polarizing polarizer, clearing of the liquid-crystal display, as a result of which no image is represented any more, is avoided.

BRIEF DESCRIPTION OF THE DRAWINGS

One exemplary embodiment of the invention is illustrated in the drawing and will be explained in more detail below. In the figures.

DETAILED DESCRIPTION OF THE PREFERRED EMBODIMENTS

Figure 1:
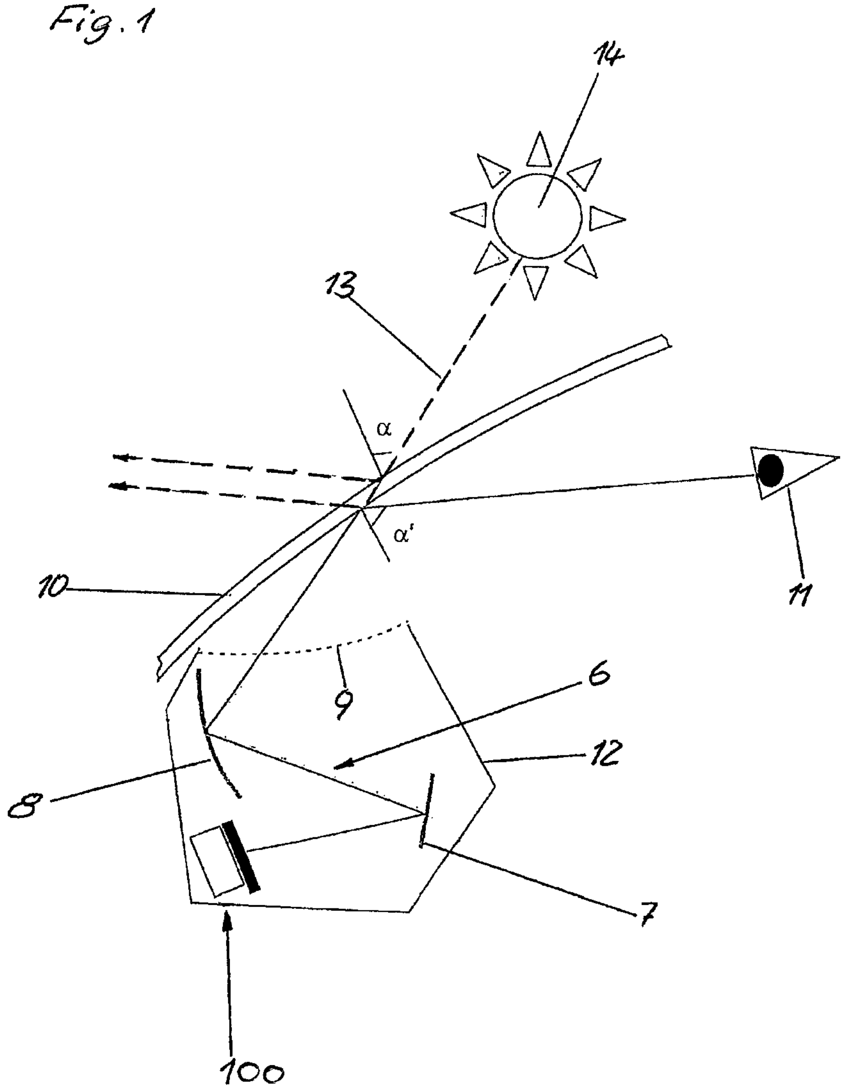
FIG. 1 is a basic illustration of a head-up display.
Figure 2:
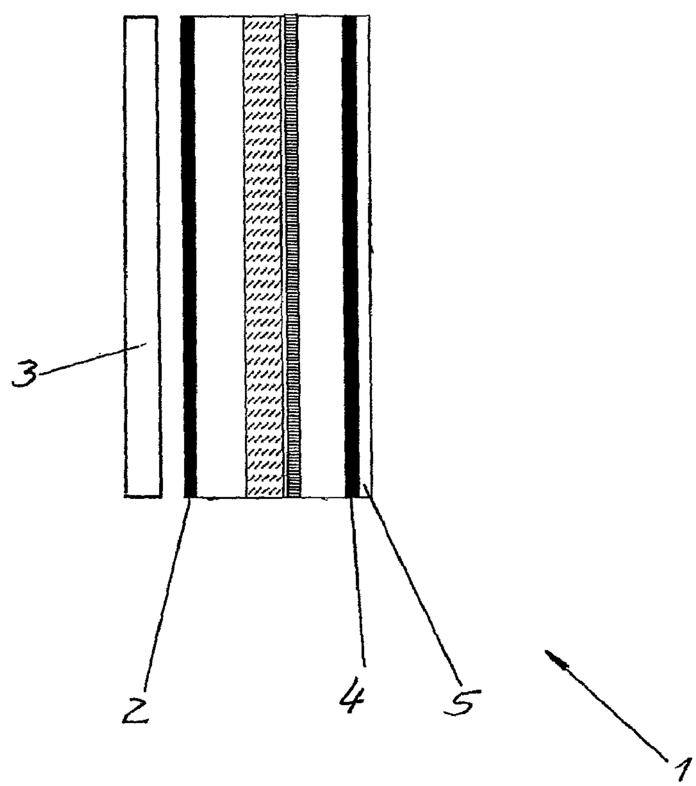
FIG. 2 is a cross-section through a liquid-crystal display of the head-up display according to FIG. 1.

A liquid-crystal display 1, the details of which are shown in FIG. 2, which is a TFT liquid-crystal display, has on its rear side a first polarizer 2, through which the light from a light source 3 enters, linearly polarized, the liquid-crystal display 1.

Arranged on the light-exit side is, on the liquid-crystal display 1, first a linear s-polarizing second polarizer 4 and, thereon, a reflecting linear polarizer 5 having the same polarization as the second polarizer 4.

The beam of an image, exiting the liquid-crystal display 1 comprises s-polarized light.

This beam is guided in a beam path 6 using imaging optical unit 100, having a mirror 7 and an aspherical mirror 8, and a transparent cover panel 9 onto a windscreen 10 of a motor vehicle and then reflected to the region of the eyes 11 of a driver of the motor vehicle.

The cover panel 9 closes a housing 12, which is located below the windscreen 10 and in which the liquid-crystal display 1, the light source 3, the mirrors 7, 8 and the imaging optical unit 100 are arranged.

By tilting the windscreen 10, the beam is deflected at the windscreen 10 by an angle of between 110° and 140°.

This means that this deflection angle corresponds to a Brewster angle α' of approximately 60°.

If the radiation 13 from the sun 14 is incident on the windscreen 10 from the outside under an angle which is close to the Brewster angle a, this sunlight is polarized in part by the windscreen 10.

Owing to the Brewster angle, the sunlight has, after the windscreen 10, a p-polarized portion that is greater than the s-polarized portion. This p-polarized portion is kept away particularly well from the liquid-crystal display 1 by the reflecting polarizer 5 and thus cannot heat it (FIG. 2).

The p-polarized portion is approximately 70%, while the s-polarized portion is only approximately 30%.

Since therefore only the 30% s-polarized portion of the sunlight can reach the liquid-crystal display 1 counter to the beam path 6 and cause heating of the liquid-crystal display 1, this heating is so low that it does not impair the function of the liquid-crystal display 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A head-up display for a motor vehicle, comprising:

an image generating device, from which beams of an image are guided at a first surface;

a polarizer assembly comprising at least a polarizer and a reflecting linear polarizer;

the polarizer arranged on a light-exit side on the image generating device configured to linearly s-polarize the beams of the image, an input surface and an output surface of the polarizer each being parallel to the first surface of the image generating device;

at least one mirror configured to guide the linearly s-polarized beams of the image to a windscreen of the motor vehicle, wherein the linearly s-polarized beams of the image are directed from the windscreen in a direction of a driver of the motor vehicle;

the reflecting linear polarizer arranged between the image generating device and the windscreen, the reflecting linear polarizer having a first planar surface upon which the beams of the image are guided and a second planar surface parallel to the first surface, the second planar surface being an ultimate output of the polarizer assembly, a polarization direction of the reflecting linear polarizer corresponds to a polarization direction of the beams emitted by the image generating device and which reflects light that travels along a beam path from the windscreen to the image generating device that has a different polarization, wherein an s-polarized portion is about 30% reflected or transmitted such that only 30% of s-polarized light can reach the image generating device along the beam path, the first planar surface and the second planar surface of the reflecting linear polarizer each being parallel to the first surface of the image generating device, wherein the light travels along the beam path from the windscreen to the at least one mirror and then directly to the second planar surface of the reflecting linear polarizer without intervening elements between the mirror and the second planar surface of the reflecting linear polarizer.

2. The head-up display as claimed in claim 1, wherein the reflecting linear polarizer is arranged on a light-exit-side polarizer of the image generating device.

3. The head-up display as claimed in claim 2, wherein the reflecting linear polarizer and the light-exit-side polarizer of the image generating device are a common film.

4. A head-up display for a motor vehicle, comprising:

an image generating device, from which beams of an image are guided at a first surface, a polarizer assembly comprising at least a polarizer and a reflecting linear polarizer;

the polarizer arranged on a light-exit side on the image generating device configured to linearly polarize the beams, an input surface and an output surface of the polarizer each being parallel to the first surface of the image generating device;

at least one mirror configured to guide the beams to a windscreen, wherein the beams are directed from the windscreen in a direction of a driver of the motor vehicle;

a planar mirror configured as the reflecting linear polarizer and arranged between the image generating device and the windscreen, the planar mirror having a first planar surface upon which the beams of the image are guided and a second planar surface parallel to the first surface, the second planar surface being an ultimate output of the polarizer assembly, the polarization direction of the reflecting linear polarizer is orientated perpendicularly with respect to the polarization direction of the beams emitted by the image generating device and which transmits this light and which absorbs or reflects light that travels along a beam path from the windscreen to the image generating device that has a different polarization, wherein a p-polarized portion is about 70% reflected or transmitted, and an s-polarized portion is about 30% reflected or transmitted such that only 30% of s-polarized light can reach the image generating device along the beam path, the first planar surface and the second planar surface of the reflecting linear polarizer each being parallel to the first surface of the image generating device, wherein the light travels along the beam path from the windscreen to the at least one mirror and then directly to the second planar surface of the planar mirror without intervening elements between the mirror and the second planar surface of the reflecting linear polarizer.

5. The head-up display as claimed in claim 4, further comprising:

a housing in which the image generating device and the at least one mirror are arranged, wherein the housing has an opening that is closed by a light-transmissive cover panel and through which the beams from the image generating device reaches the windscreen, and wherein the reflecting linear polarizer is arranged on or in the cover panel.

6. The head-up display as claimed in claim 4, wherein the image generating device is a liquid-crystal display, through which a light source can shine and which, on a light-entry side, has a p-polarizing polarizer.

7. The head-up display as claimed in claim 4, wherein the mirror is a part of an imaging optical unit.

8. The head-up display as claimed in claim 1, further comprising:

a housing in which the image generating device and the at least one mirror are arranged, wherein the housing has an opening that is closed by a light-transmissive cover panel and through which the beams from the image generating device reaches the windscreen, and wherein the reflecting linear polarizer is arranged on or in the cover panel.

9. The head-up display as claimed in claim 8, wherein the image generating device is a liquid-crystal display, through which a light source can shine and which, on a light-entry side, has a p-polarizing polarizer.

10. The head-up display as claimed in claim 1, wherein the mirror is an aspherical mirror arranged between the image generating device and the windscreen.

11. The head-up display as claimed in claim 4, wherein the mirror is an aspherical mirror arranged between the image generating device and the windscreen.

* * * * *